United States Patent [19]

Shoji et al.

[11] 4,415,072
[45] Nov. 15, 1983

[54] ONE-WAY CLUTCH

[75] Inventors: Masao Shoji, Fujisawa; Yoshio Kinoshita, Chigasaki, both of Japan

[73] Assignee: NSK-Warner K. K., Tokyo, Japan

[21] Appl. No.: 248,351

[22] Filed: Mar. 27, 1981

[30] Foreign Application Priority Data

Apr. 10, 1980 [JP] Japan ................... 55-46175
Apr. 10, 1980 [JP] Japan ............... 55-47612[U]

[51] Int. Cl.³ ............................................ F16D 41/06
[52] U.S. Cl. ...................................................... 192/45
[58] Field of Search .................... 192/45; 188/82.84

[56] References Cited

U.S. PATENT DOCUMENTS 2,372,026  3/1945  Smith ............................. 188/82.84
3,221,850 12/1965  Bacon ................................... 192/45

FOREIGN PATENT DOCUMENTS 489084  6/1976  Australia ............................. 192/45
594141  3/1934  Fed. Rep. of Germany ........ 192/45

Primary Examiner—Allan D. Herrmann
Attorney, Agent, or Firm—Shapiro and Shapiro

[57] ABSTRACT

A one-way clutch formed between an inner race and an outer race rotatable relative to each other for preventing the relative rotation thereof exceeding a predetermined limit. The permission and prevention of the relative rotation of the two races is accomplished by rollers contained in roller containing grooves formed in the inner race or the outer race. The opposite side walls of each containing grooves for holding the rollers in a predetermined state are formed by a roller holding member mounted to the inner race or the outer race. Engaging portions and engaged portions are formed on the holding member and the rollers, respectively.

19 Claims, 20 Drawing Figures

ONE-WAY CLUTCH

BACKGROUND OF THE INVENTION

1. Field of the Invention

This invention relates to improvements in a roller type one-way clutch.

2. Description of the Prior Art

In a one-way clutch of the above type, as shown in FIGS. 1 to 4 of the accompanying drawings, a roller 1 is contained in a roller containing groove 4 formed in an inner race 2 or an outer race 3 and is biased directly by a spring 5 or indirectly through a pressing member 6 in a direction in which the spacing between the bottom surface 7 of the groove and a circular circumferential surface 8 becomes narrower. However, in the examples shown in FIGS. 1 and 3, the machining required for the formation of an insertion hole 9 in which the spring 5 and the pressing member 6 are inserted is difficult and the manufacturing cost is increased. In the examples shown in FIGS. 2 and 4, it is difficult for the spring 5 to be held at a predetermined position and the spring is liable to be damaged. This tendency becomes pronounced particularly where the spring is used for the overrunning of the inner race 2.

Also, when the inner race 2 or the outer race 3 wherein the roller 1 is held in the roller containing groove 4 is to be assembled to the outer race 3 or the inner race 2, the roller 1 must be moved in a direction in which the groove bottom surface 7 becomes deeper (the clockwise direction in the drawings) by the use of a jig against the biasing force of the spring 5, thus making the assembly and handling difficult.

SUMMARY OF THE INVENTION

It is a first object of the present invention to provide a one-way clutch which is easy to assemble and inexpensive to manufacture as well as convenient to handle and high in performance.

It is a second object of the present invention to provide various forms of a roller holding member for rotatably holding a roller and various modes of the engagement system between the roller holding member and the roller.

The invention will become fully apparent from the following detailed description thereof taken in conjunction with the accompanying drawings.

DESCRIPTION OF THE PREFERRED EMBODIMENTS

Figure 1:
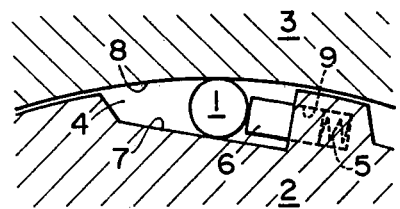
FIGS. 1 to 4 are cross-sectional views showing essential portions of the one-way clutches according to the prior art.
Figure 2:
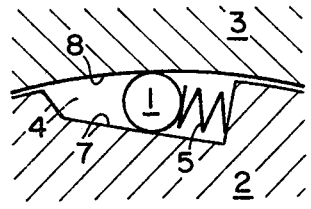
Figure 3:
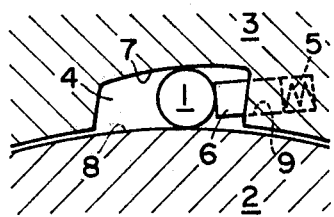
Figure 4:
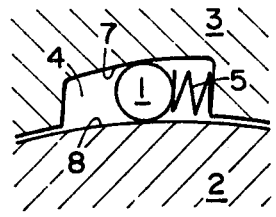
Figure 5:
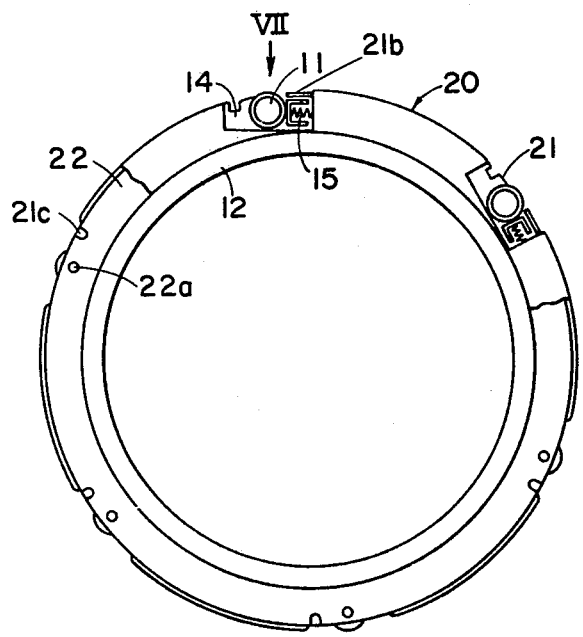
FIGS. 5 and 6 are a partly cut away front view and a longitudinal sectional view, respectively, of an embodiment of the present invention.
Figure 6:
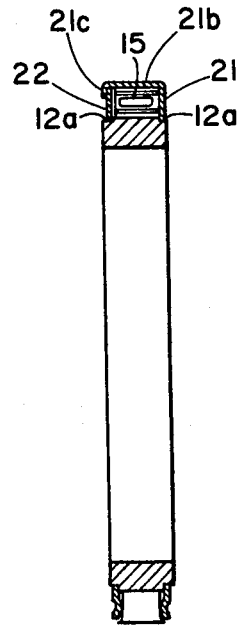

Referring to FIGS. 5 and 6, there is shown the inner race frame of a one-way clutch which comprises an inner race 12 provided with a suitable number of roller containing grooves 14, rollers 11 contained in the roller containing grooves, springs 15 for biasing the rollers in one direction, and a roller holding member 20.

Figure 7:
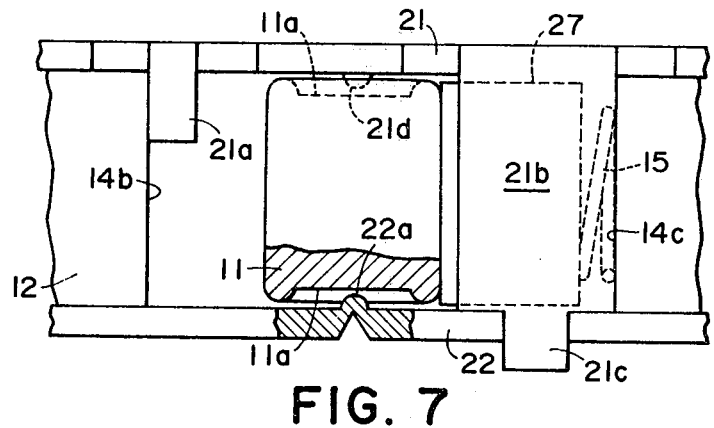
FIG. 7 is an enlarged view taken along the direction of arrow VII in FIG. 5.
Figure 8:
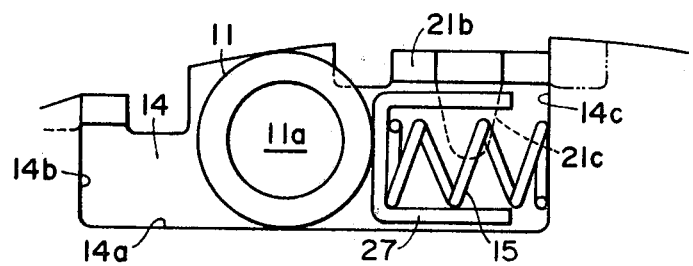
FIG. 8 is an enlarged view of the essential portions shown in FIG. 5.

The details of the neighborhood of a roller 11 are shown in FIGS. 7 and 8. Each of the roller containing grooves 14 is provided with a cam surface 14a forming the bottom of the groove, a front wall surface 14b and a back wall surface 14c. A ring-like cage (first portion) 21 and a side plate (second portion) 22 are mounted on the opposite end surfaces, respectively, of the inner race 12 by utilization of stepped portions 12a (see FIG. 6). The cage 21 is provided with a positioning piece 21a bent at right angles and bearing against the front wall surface 14b, a connecting piece (third portion) 21b bent substantially at right angles and bearing against the back wall surface 14c, and a restraint portion 21c bent substantially at right angles and restrained by the side plate 22. The cage 21, the connecting piece 21b, etc. are formed of a sheet of plate material. Alternatively, these may be separate members.

Inwardly projected convex portions 21d and 22a are provided on the cage 21 and the side plate 22, respectively, and correspondingly thereto, circular concave portions 11a are formed in the opposite end surfaces of the roller 11 contained in the roller containing groove 14. The roller 11 is biased in one direction (leftwardly as viewed in FIGS. 7 and 8) by a spring 15 through a cap 27, the spring 15 being disposed between the roller and the back wall surface 14c. The cap 27 is positioned inwardly of the connecting piece 21b and is U-shaped. The spring 15 has a laterally elongated square shape.

In assembling the inner race frame, the inner race 12 is first placed on the cage 21 with the inner race positioned by the positioning piece 21a, and then the spring 15 and cap 27 are fitted into the containing groove 14, whereafter the side plate 22 is placed on the inner race and the restraint portion 21c is bent, whereby the roller holding member 20 (including cage members 21 and 22); is assembled to the inner race 12. Subsequently, the roller 11 is forced into the roller containing groove 14 from above (as viewed in FIG. 8), whereupon the roller is moved leftwardly (as viewed in FIG. 8) by the biasing force of the spring 15 and becomes slightly exposed from the outer peripheral surface of the inner race 12. This movement is limited and the disengagement of the roller 11 from the containing groove 14 is prevented by the engagement between the convex portions 21d, 22a and the concave portions 11a.

The thus assembled inner race frame is combined with an outer race frame, not shown. Such combination is allowed by the roller 11 moving radially of the inner race 12 (strictly, rearwardly in the containing groove 14).

The inner race frame is rotatable only in counterclockwise direction as viewed in FIG. 8.

In the present embodiment, the roller holding member 20, the roller 11 and the spring 15 are made into a unit and this leads to the simplicity of assembling and handling. In the prior art, when the inner and outer races are to be combined with each other, it has been necessary to rotate the inner race or the outer race in one direction (the direction in which the roller enters) by utilization of a jig or the like, whereas in the present embodiment such a procedure is not at all required but the inner race frame can be mechanically assembled and this leads to reduced cost of manufacture.

This is a result of having deliberately designed the configuration and construction of the roller holding member 20 and having made the roller 11 rotatable and movable by forcing in the roller after having assembled the holding member 20 and bringing the convex portions 21d, 22a and the concave portions 11a into engagement with each other. There is no exclusive retainer around the roller 11 and this leads to the simplicity of the entire structure.

The diameter of the concave portions 11a, namely, the amount of possible movement of the roller 11, is determined by taking into account a case where the clutch effects an operation such as eccentricity or engagement, but may be arbitrarily altered as required.

Figure 9:
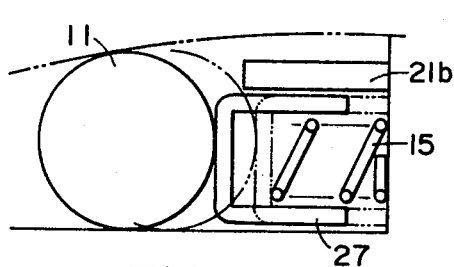
FIG. 9 illustrates the operation.
Figure 10:
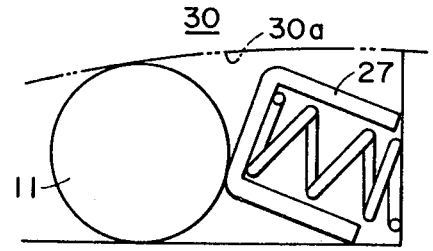
FIG. 10 illustrates the operation of an example of the prior art.

Furthermore, it should be noted that the connecting piece 21b is positioned outwardly (above as viewed in FIG. 8) of the cap 27. Without this, the cap 27 would be moved outwardly by centrifugal force as shown in FIG. 10 and abraded or damaged and also the inner peripheral surface 30a of the outer race 30 would be damaged, whereas occurrence of such situations is prevented by the connecting piece 21b. The connecting piece 21b serves also as a guide member for guiding the movement of the cap 27 as shown in FIG. 9, whereby a predetermined biasing force is imparted to the roller 11 through the spring 15.

Figure 11:
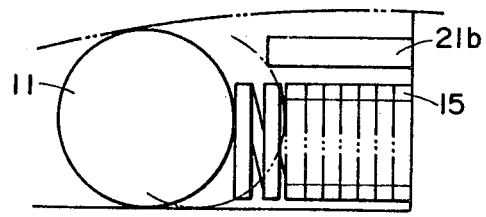
FIG. 11 shows a modification of the above embodiment.

If the spring 15 is of an elongated square shape, it will perform a function similar to that of the cap 27 and therefore, the cap 27 may be eliminated as shown in FIG. 11.

Another embodiment of the present invention will now be described.

Figure 16:
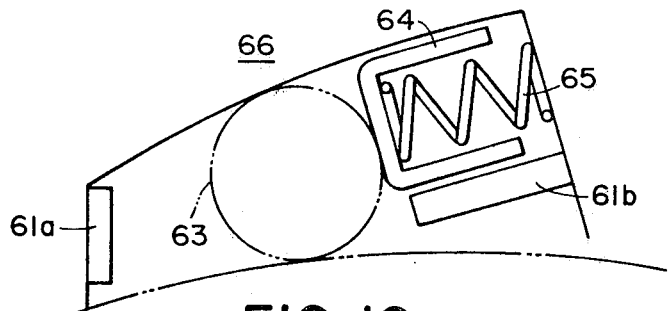
Figure 17:
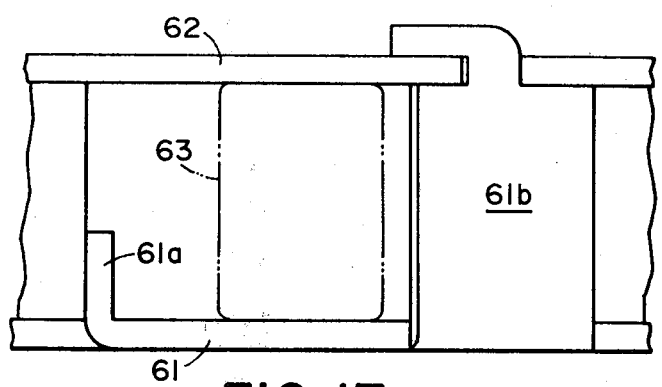
Figure 18:
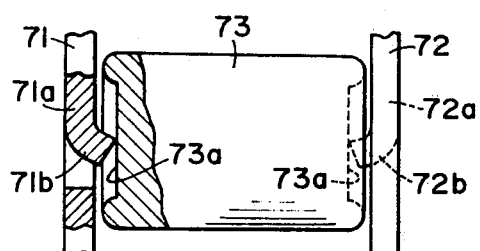
FIGS. 18, 19 and 20 are cross-sectional views of essential portions of still further embodiments of the present invention.
Figure 19:
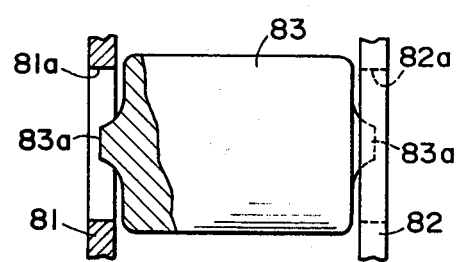
Figure 20:
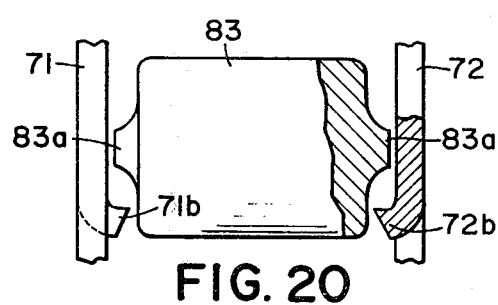

FIGS. 12-17 show modifications of the holding member, and FIGS 18-20 show modifications of the roller engaging portion.

Figure 12:
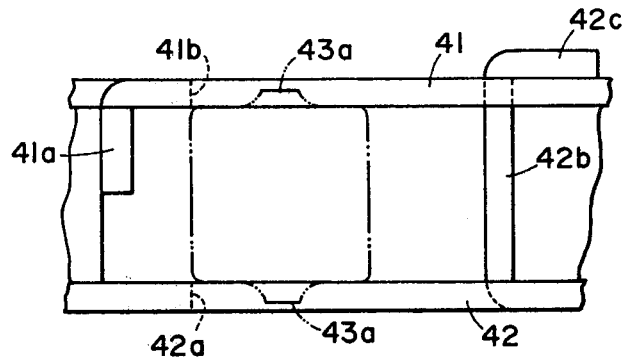
FIGS. 12 and 13, 14 and 15, 16 and 17 are views corresponding to FIGS. 7 and 8 but showing further embodiments of the present invention.
Figure 13:
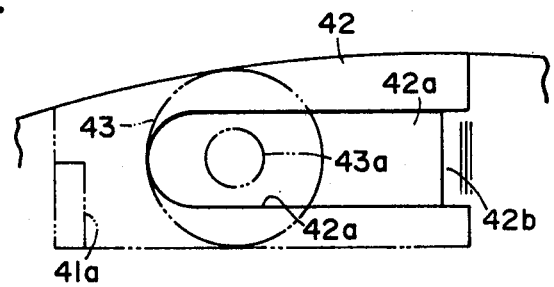

Referring to FIGS. 12 and 13, a side plate 41 is formed with a positioning piece 41a and a slot 41b, and a cage 42 is formed with a slot 42a and a connecting piece 42b by forming a notch in a portion of the cage and then bending up that portion. The fore end portion 42c of the connecting piece 42b juts out from the slot 41b, and then is bent at right angles. Convex portions 43a are projectedly provided on the opposite end surfaces of a roller 43. The cap, spring, etc. are not shown in these Figures.

Figure 14:
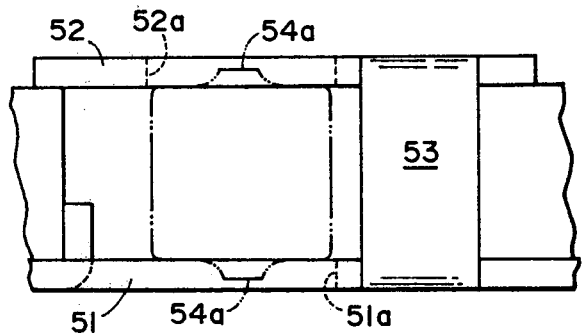
Figure 15:
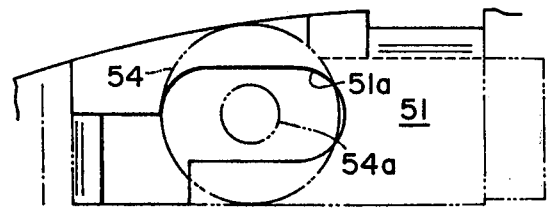

In the modification shown in FIGS. 14 and 15, a side plate (portion) 51 and a cage (portion) 52 are formed of a sheet of plate material. The side plate 51 is of a ring-like shape while the cage 52 assumes an elongated rectangular shape, and they are connected together by a connecting portion 53. The engagement between a roller 54 and the side plate 51 and the cage 52 is substantially similar to what has been described with respect to the foregoing embodiment. That is, projected portions 54a provided on the opposite end surfaces of the roller 54 are engaged with cut-aways 51a and 52a, respectively, formed in the side plate 51 and cage 52.

Also, as shown in FIGS. 16 and 17, a cage 61 provided with a positioning piece 61a and a connecting piece 61b, a side plate 62, a roller 63, a cap 64 and a spring 65 may be mounted to an outer race 66. Although the engagement system between the roller 63 and the cage 61 and the side plate 62 is not shown, it may be any of the hitherto described systems.

Further, in the embodiment shown in FIG. 18, the engaging portions are provided by the tip end portions 71b and 72b of bent-up pieces 71a and 72a formed in a cage 71 and side plate 72 by bending up, and the engaged portion is provided by recesses 73a formed in the opposite end surfaces of a roller 73.

In the embodiment shown in FIG. 19, the engaging portions are provided by convex portions 83a projectedly provided in the opposite end surfaces of a roller 83 at the center thereof, and the engaged portion is provided by slots 81a and 82a formed in a cage 81 and a side plate 82, respectively.

In the embodiment shown in FIG. 20, the engaged portions 71b and 72b shown in FIG. 18 are combined with the engaging portions 83a shown in FIG. 19.

In the present invention, in addition to what has been described above, changes such as mounting the roller holding member and the roller on the outer race side may suitably be made on the basis of the knowledge of the persons skilled in the art.

We claim:

1. A unitary structure for a one-way clutch assembly adapted to be disposed between two relatively rotatable members so as to permit relative axial rotation between the two members in one direction but prevent relative axial rotation between the two members in the other direction, comprising a race formed with grooves at the periphery thereof, each groove being defined by a bottom and by first and second side walls extended in the direction of the depth of the groove and distant from each other in the peripheral direction of the race;

a pair of parallel annular cage plates positioned relative to said race to form radial side walls of the grooves;
a plurality of rollers received in the respective grooves;
a plurality of springs disposed in the respective grooves to bias the rollers toward the direction to prevent the relative rotation between said two members;
means for connecting the two parallel cage plates to fix the cage plates to each other and to the race in the axial direction;
means for preventing relative rotation between the race and the two cage plates; and
wherein said connecting means includes a plurality of axial members that extend from a peripheral portion of one of said annular cage plates and that engage the other of the annular cage plates.

2. A structure according to claim 1, wherein said axial members are, respectively, in engagement with the first side walls of the grooves of the race; and
the preventing means includes a plurality of second axial members extended from one of the two annular cage plates, the second axial members being, respectively, in engagement with the second side walls of the grooves of the race.

3. A structure according to claim 1, further including a plurality of caps for covering the respective springs.

4. A structure according to claim 3, further comprising means for guiding movement of the caps whereby a predetermined biasing is imparted to the rollers through the springs.

5. A structure according to claim 1, wherein each roller is cylindrical and has concave ends opposed to the respective cage plates, the cage plates being formed with axially inwardly convex portions for engagement with the respective concave ends of the rollers.

6. A structure according to claim 5, wherein said convex portions are formed by punching.

7. A structure according to claim 5, wherein said convex portions are formed by bending.

8. A structure according to claim 1, wherein each of the springs is of an elongated square shape.

9. A one-way clutch assembly adapted to be disposed between two relatively rotatable members so as to permit relative axial rotation between the two members in one direction but prevent relative axial rotation between the two members in the other direction, comprising an outer race, an inner race formed with grooves at the periphery thereof, each groove being defined by a bottom and by first and second side walls extended in the direction of the depth of the groove and distant from each other in the peripheral direction of the inner race;

a pair of parallel annular cage plates positioned relative to said inner race to form radial side walls of the grooves;

a plurality of rollers received in the respective grooves;

a plurality of springs disposed in the respective grooves to bias the rollers toward the direction to prevent the relative rotation between said two members;

means for connecting the two parallel cage plates to fix the cage plates to each other and to the inner race in the axial direction;

means for preventing relative rotation between the inner race and the two cage plates; and wherein said connecting means includes a plurality of axial members that extend from a peripheral portion of one of said annular cage plates and that engage the other of the annular cage plates.

10. A one-way clutch assembly according to claim 9, wherein said axial members are, respectively, in engagement with the first side walls of the grooves of the inner race; and the preventing means includes a plurality of second axial members that extend from one of the two annular cage plates, the second axial members being, respectively, in engagement with the second side walls of the grooves of the inner race.

11. A one-way clutch assembly according to claim 9, further including a plurality of caps for covering the respective springs.

12. A one-way clutch assembly according to claim 11, wherein said caps are positioned radially inside of the respective axial members.

13. A one-way clutch assembly according to claim 9, wherein each roller is cylindrical and has concave ends opposed to the respective annular cage plates, the cage plates being formed with axially inwardly convex portions for engagement with the respective concave ends of the rollers.

14. A one-way clutch assembly according to claim 13, wherein said convex portions are formed by punching.

15. A one-way clutch assembly according to claim 13, wherein said convex portions are formed by bending.

16. A one-way clutch assembly according to claim 9, wherein each of the springs is of an elongated square shape.

17. A one-way clutch assembly adapted to be disposed between two relatively rotatable members so as to permit relative axial rotation between the two members in one direction but prevent relative axial rotation between the two members in the other direction, comprising an inner race, an outer race formed with grooves at the periphery thereof, each groove being defined by a bottom and by first and second side walls extended in the direction of the depth of the groove and distant from each other in the peripheral direction of the outer race;

a pair of parallel annular cage plates positioned relative to said outer race to form radial side walls of the grooves;

a plurality of rollers received in the respective grooves;

a plurality of springs disposed in the respective grooves to bias the rollers toward the direction to prevent the relative rotation between said two members;

means for connecting the two parallel cage plates to fix the cage plates to each other and to the outer race in the axial direction;

means for preventing relative rotation between the outer race and the two cage plates; and wherein said connecting means includes a plurality of axial members that extend from a peripheral portion of one of said two annular cage plates and that engage the other of the annular cage plates.

18. A one-way clutch assembly according to claim 17, further including a plurality of caps for covering the respective springs.

19. A one-way clutch assembly according to claim 18, wherein the caps are positioned radially outside of the respective axial members.

* * * * *